Patented Feb. 19, 1929.

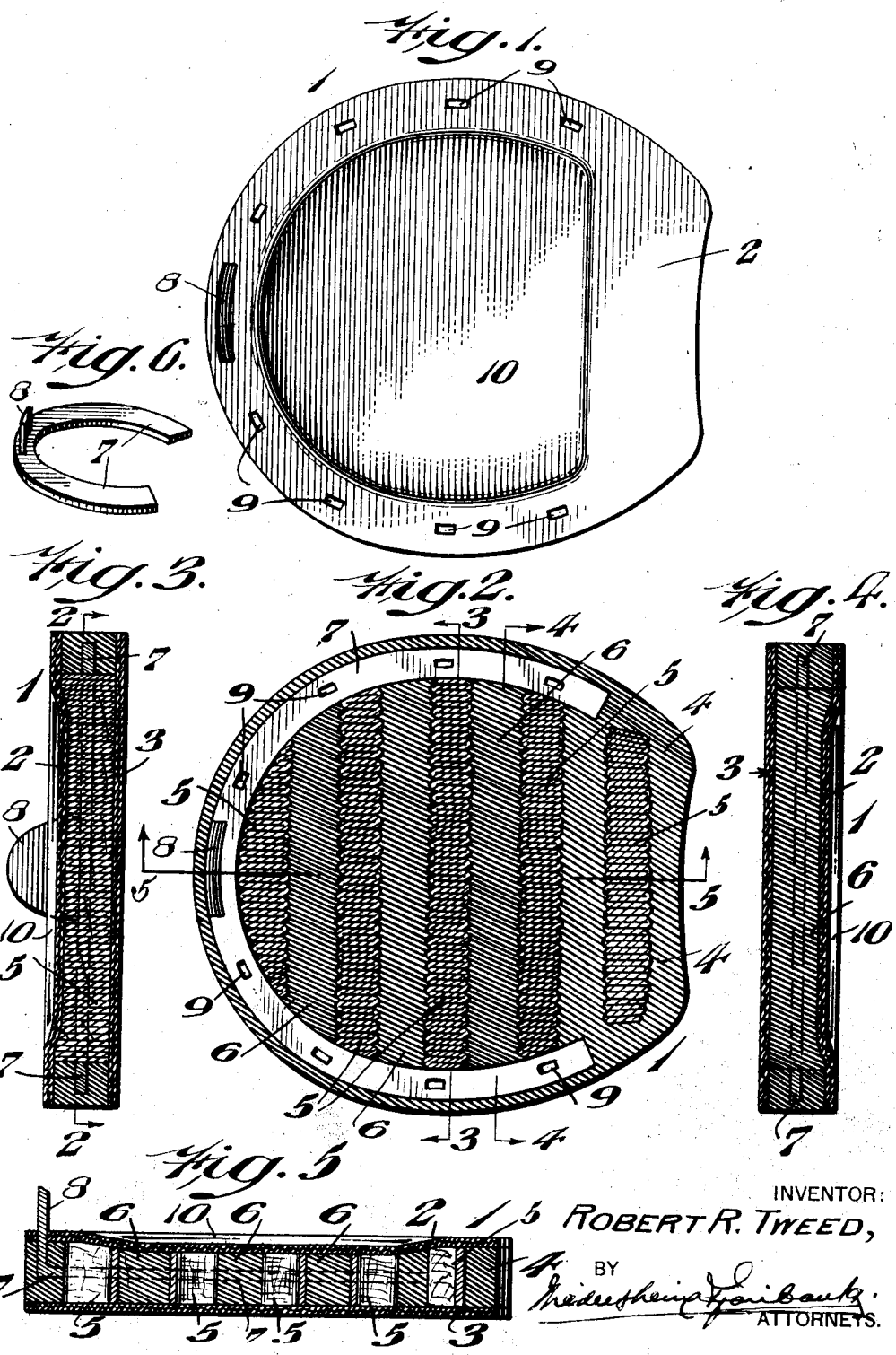

1,702,882

UNITED STATES PATENT OFFICE.

ROBERT R. TWEED, OF AUDUBON, NEW JERSEY.

HORSESHOE.

Application filed February 27, 1928. Serial No. 257,188.

My invention relates to a new and useful horseshoe construction which will afford a soft tread and a firm grip, thereby reducing the strain on animals and preventing accidents due to slipping on wet roads and pavements.

My invention further relates to a new and useful horseshoe which will afford complete protection for the entire bottom or underside of the hoof; that is, one which will protect and cover not only the peripheral horny part of the hoof, but the tender central and rear portions thereof such as the frog and the central cavity of the hoof, to prevent the contact of such tender parts with the hard roadbed and to prevent the entry of dirt and stones thereinto.

My invention further relates to a new and useful horseshoe of this general character, which while covering the entire under side of the hoof, and possessing great resiliency and firmness of grip, also possesses the solidity and rigidity inherent in metallic horseshoes, thus combining in one device the advantageous features of solidity, stability, resiliency, and grip.

To the above ends my invention consists of a horseshoe composed of a central body portion composed of alternate layers of fiber and rubber vulcanized together, a reinforcing metallic band embedded therein, and upper and lower layers of vulcanized canvas and rubber enclosing said central body portion and said band.

My invention further consists in various other novel features of construction hereinafter described and claimed.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities.

In the accompanying drawings, Fig. 1 represents a top plan view of a horseshoe embodying my invention,
Fig. 2 represents a section on line 2—2 of Fig. 3,
Fig. 3 represents a section on line 3—3 of Fig. 2, Fig. 4 represents a section on line 4—4 of Fig. 2,
Fig. 5 represents a section on line 5—5 of Fig. 2, and
Fig. 6 represents a perspective view of the reinforcing band detached forming part of my invention.

Referring to the drawings in which like reference characters designate like parts, 1 designates a horseshoe embodying my invention comprising a body having the upper and lower layers 2 and 3, formed of a plurality of thicknesses of canvas or other suitable material, interspersed with layers of rubber and vulcanized. The body portion of my novel horseshoe is composed of transverse alternate blocks of canvas and rubber 5 and 6 respectively, the canvas being closely folded upon itself and positioned vertically as will be understood from Fig. 2. 7 designates a reinforcing U-shaped metallic band which is embedded in the body portion of rubber and canvas and which extends rearwardly and converges in the usual manner, said band being provided with an upwardly projecting lug or toe calk 8 which serves to protect the toe or front extremity of the hoof. The upper surface of the horseshoe is depressed or concaved as at 10 to form a concavity for receiving the hoof of the animal to be shod.

In manufacturing my novel horseshoe, I first arrange the parallel rows of folded or convoluted canvas 5 within and at the rear of the metallic band 7 (see Fig. 2), and then fill the mold above, below, and around said rows of canvas and said band with rubber. I then position the upper and lower layers of canvas 2 and 3, properly saturated and interspersed with rubber, to form the depression 10 in the upper surface of the shoe, and vulcanize the entire assembly so that a solid, integral amalgamated mass of canvas and rubber is produced, as will be understood from the drawings. I then drill the holes 9 clear through the vulcanized rubber and canvas and the metallic band 7 for the reception of the nails employed in securing the shoe to the hoof.

It is to be noted that by extending the rubber around and beyond the metallic band 7, or in other words by embedding said band therein as described, I am enabled to trim the periphery of the shoe to fit hoofs of different sizes, so that my novel horseshoes need only be manufactured in a few standard sizes, since by thus trimming the shoe it can be cut down to fit hoofs of slightly different contours and sizes.

It will further be noted that by positioning the canvas in the rows or blocks 5 in a vertical, closely folded condition, I greatly prolong the life of the shoe since the vertical edges of the canvas wear out very gradually and are not liable to peel off and work loose as would be the case if the canvas were laid flat in a horizontal position where its entire wide surface as contradistinguished from its narrow edges would contact with the ground.

It will also be seen that the metallic band 7 does not extend into the rear portion 4 which bears upon the soft rear portion or frog of the hoof, where no great resistance or solidity is required thereby providing a soft cushion for the tender part of the hoof and at the same time preventing its contact with the hard ground, as well as the accumulation of dirt therein.

My novel horseshoe thus combines the solidity and rigidity of a metallic horseshoe, with the soft resiliency and cushioning effect of a soft pad, thereby giving the animal a soft but nevertheless solid tread and at the same time preventing slipping on wet or frozen roads. Furthermore, due to the insulating character of rubber and canvas, the animal's hoof is protected against any sudden and extreme changes in temperature, as will be apparent.

I am aware that the invention may be embodied in other specific forms without departing from the spirit or essential attributes thereof; and I therefore desire the present embodiment to be considered in all respects as illustrative and not restrictive, reference being had to the appended claims rather than to the foregoing description to indicate the scope of the invention.

Having thus described my invention what I claim as new and desire to secure by Letters Patent, is:—

1. A horseshoe of the character stated, comprising a body composed of alternate transverse rows of rubber and canvas, the latter being closely folded and disposed vertically, upper and lower horizontally disposed layers of canvas, and a metallic band embedded in said body, the upper surface of said horseshoe being depressed to form a seat for the hoof.

2. A horseshoe of the character stated, comprising a tough resilient pad, a metallic band completely embedded therein, said pad being composed of a rear body portion, and a central body portion composed of alternate transverse rows of rubber and canvas, the latter being folded closely and disposed vertically, and upper and lower layers of canvas, said horseshoe having a seat in its upper surface for the reception of the hoof.

3. A horseshoe of the character stated, comprising a tough resilient pad, a metallic band completely embedded therein, said pad being composed of a rear body portion and a central body portion composed of alternate transverse rows of rubber and canvas, the latter being folded closely and disposed vertically, and upper and lower layers of canvas, said horseshoe having a seat in its upper surface for the reception of the hoof, said band having a front toe calk projecting through the top of said pad, there being alining holes through said metallic band and the body above and below said band.

4. A horseshoe of the character stated, comprising a tough resilient pad composed of a rear body portion and a central body portion formed of alternate transverse rows of rubber and canvas, the latter being folded closely and disposed vertically, a metallic U-shaped band embedded in said central body portion, and upper and lower layers of canvas, said horseshoe having a seat in its upper surface for the reception of the hoof, and a front toe calk on said band projecting upwardly through the top of said pad, there being alining holes extending through said pad and central body, the rear transverse row of canvas being positioned outside the terminals of said U-shaped band.

ROBERT R. TWEED